April 15, 1969   W. P. CLINTON ET AL   3,438,784
FREEZE-DRYING OF GRANULAR COFFEE EXTRACT
Filed Feb. 9, 1968

INVENTORS
WILLIAM P. CLINTON
JAMES P. MAHLMANN
GEORGE B. PONZONI
BY
ATTORNEYS

United States Patent Office 3,438,784
Patented Apr. 15, 1969

3,438,784
FREEZE-DRYING OF GRANULAR COFFEE EXTRACT
William P. Clinton, Monsey, N.Y., James Mahlmann, Wayne, N.J., and George B. Ponzoni, Spring Valley, N.Y., assignors to General Foods Corporation, White Plains, N.Y., a corporation of Delaware
No Drawing. Continuation-in-part of application Ser. No. 534,176, Mar. 14, 1966, which is a continuation-in-part of application Ser. No. 264,063, Mar. 11, 1963. This application Feb. 9, 1968, Ser. No. 724,655
Int. Cl. A23f 1/04, 1/08
U.S. Cl. 99—71                                    10 Claims

ABSTRACT OF THE DISCLOSURE

Coffee extract is frozen either fast or slow, depending on its concentration, to obtain a dark-colored product which is then subdivided to a granular particle size prior to vacuum freeze-drying.

RELATED APPLICATIONS

Figure 1:
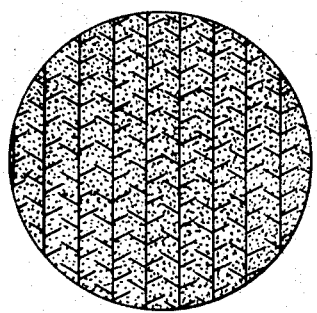

This application is a continuation-in-part of Ser. No. 534,176 (filed Mar. 14, 1966) now abandoned which was a continuation-in-part of Ser. No. 264,063 (filed Mar. 11, 1963) now abandoned.

BACKGROUND OF THE INVENTION

The present invention relates to an improved method for vacuum freeze-dyring coffee which has been frozen in a controlled manner and then subdivided to a specific particle size.

In the past, coffee extract has been frozen and then subdivided in preparation for freeze-drying. However, this product has had disadvantages in regard to stability, appearance (especially color) and has presented various processing problems, e.g., entrainment (fines loss during freeze-drying) and non-uniform drying due to varying particle size distribution. Coffee has also been frozen directly into pellets or spheres and then freeze-dried (Colton 2,761,687). Due to the size and uniformity of the Colton pellets, problems of entrainment, stability, and non-uniformity in the particles being dried are largely eliminated. However, disadvantages of a high density, and an uncoffee-like color and appearance in the freeze-dried coffee persist. The problems of flavor stability (rancidity and staling), moisture stability (caking), appearance and color, and bulk density of the final product as well as the processing problems of working with a non-uniform particle size distribution are particularly manifest when one tries to produce a stable freeze-dried coffee having the particle appearance and color of freshly roasted and ground coffee but the bulk density of conventional (spray-dried) instant coffee.

It is an object of this invention to produce freeze-dried coffee which is stable during normal commercial storage conditions.

Another object of this invention is to produce a dark-colored freeze-dried coffee having the appearance of roasted and ground coffee but the bulk density of spray-dried coffee.

Still another object is to avoid entrainment loss during freeze-drying and the presence of very small particles (fines) in the final dried product.

Still another object is to avoid the problems presented in drying frozen coffee of non-uniform particle size distribution.

Other objects of this invention will be apparent from a reading of this specification and claims.

SUMMARY OF THE INVENTION

This invention is founded on the discovery that a stable, dark-colored freeze-dried coffee can be produced having the appearance of roasted and ground coffee by freezing coffee extract having a concentration of below 50% soluble solids slowly from its ice point to below its eutectic point over a period of at least 15 minutes to develop a non-ordered distribution of dendritic ice crystals, said crystals being characterized by non-parallel main stems, smaller extending branches from said main stems, and an absence of discrete ice crystals of non-dendritic form in the eutectic mixture located between the dendritic ice crystals, subdividing the frozen coffee to obtain a granulated product having at least 97% by weight of the particles greater than 80 mesh (177 microns) and then vacuum freeze-drying the slowly frozen granulated coffee.

In the case of above 50% solids extract, the coffee may be frozen in a period of 3 to 15 minutes prior to being ground and freeze-dried while still obtaining a dark-colored coffee.

DETAILED DESCRIPTION OF THE INVENTION

As used herein, the term "ice point" refers to that temperature at which water begins to crystallize out of coffee solution in the form of ice crystals, this temperature will vary with the coffee concentration, the higher the concentration the lower the ice point; the term "eutectic point" is that temperature at which the coffee is completely frozen or the lowest temperature at which any combination of coffee solids (soluble and insoluble), water and aromatics will melt; mesh size means U.S. mesh Standard Sieve Screen; and freeze-drying refers to drying under a vacuum of less than 500 microns at a temperature of below $-10°$ F. to remove free water ice (during the initial stage of drying) and a temperature of below $100°$ F. to remove water present as part of the eutectic mixture (during the terminal stage of drying).

The avoidance of particles having a mesh size of less than 80 mesh, preferably less than 40 mesh, is most important since the presence of particles of this size present disadvantages relative to controlling the stability, bulk density, color and freeze-drying conditions to be employed. In the case of the smaller than 40 mesh fraction, the presence of more than 10% of this fraction presents difficulties in achieving an average bulk density which approaches that of spray-dried soluble coffee powder. Also, the small particles, particularly the less than 80 mesh particles, are lighter in color and may present an undesirable speckled appearance in the final product despite slow-freezing of the extract. These particles also tend to lose volatiles due to premature drying, to fluidize or entrain in the evolved vapors produced during drying, and to compact or partially fill the void spaces in the charge of granular material thereby presenting a barrier to water vapor removal.

It is a feature of this invention that a soluble coffee product of improved flavor and aroma may be obtained by freeze-drying an aromatized aqueous extract of coffee. The extract is aromatized by removing the desirable aromatic constituents from freshly roasted and ground coffee and combining these desirable aromatic constituents with conventional or dearomatized coffee extract which is then slowly frozen, subdivided into a granular particle form, and freeze-dried.

In aromatizing the coffee extract, it is possible to use volatile coffee aromas (grinder gas, roaster gas, vacuum distilled aroma, and steam distilled aroma), coffee oils, or a combination of volatiles and oil. In this regard a combination of expressed coffee oil and volatile steam aroma is preferred. These aromatization techniques are well known in the prior art and any of these techniques can be used in the process of this invention.

Figure 2:
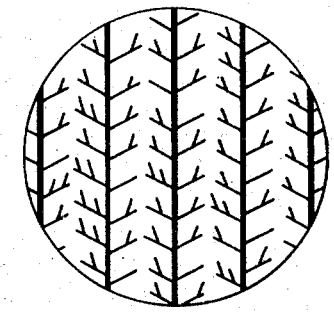
Figure 3:
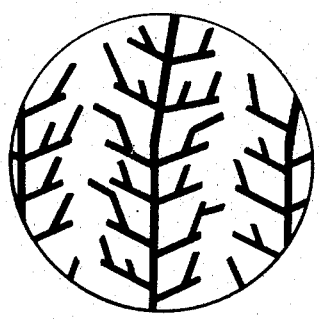
Figure 4:
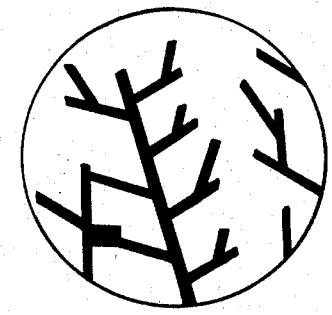

When employing extract below 50% solids concentration, whether it be extract taken directly from the percolators (20%–30% solids) or extract which has been freeze-concentrated to remove part of the water and has a solids content of between 30% and 50%, preferably about 35%–40%, it is essential that the extract be frozen at a sufficiently slow rate to form the ice crystal structure illustrated in FIGS. 3 and 4 of the drawing. These figures show the preferred ice crystal lattice (shown in black) which is necessary to give a dark-colored soluble coffee product (shown in white). It should be noted that the dendrites of ice (frozen water having substantially no dissolved coffee solids) assume a haphazard or non-ordered distribution of ice crystals in comparison to the FIGS. 1 and 2 illustration. In FIGS. 3 and 4, the dendrites of water ice are characterized by non-parallel main stems, smaller extending branches from said main stems, and an absence of discrete ice crystals of non-dendritic form in the eutectic mixture of coffee solids, water and aromatics located between said dendritic ice crystals.

Freezing as carried out according to this invention should be at a slow and uniform rate which substantially avoids occlusion or entrainment of ice crystals in the eutectic mixture and should be done over a period of at least 15 minutes, preferably 30 minutes. FIG. 1 shows a typical ice crystal lattice formed by rapidly freezing coffee over a period of several seconds to several minutes. This ice lattice leaves a light tan color on drying. FIG. 2 shows a 10-minute sample. This is also unsuitable. FIGS. 3 and 4 show a 30-minute and 90-minute sample respectively and give a dark-colored product on drying. When slow freezing according to this invention with substantially uniform heat removal, a non-ordered dendritic ice crystal structure (similar to FIGS. 3 and 4) will be formed when the heat removal is in the range of 0.5–3.5 calories per gram per cc. per minute. As the ice slowly precipitates out of the solution and forms dendrites of ice (shown in black) the coffee solution is progressively concentrated into thick walls or webs of coffee solids and water (shown in white).

A suitable ambient freezing temperature for slowly freezing a ½″ thick slab of coffee extract having a dimension of 40″ x 20″ and a product temperature of 35° F. is −30° to −40° F. Complete freezing of the extract is accomplished over a period of about 120–150 minutes, the ice crystal formation taking 100 minutes.

After freezing, the extract is granulated or subdivided to a coarse particle size. This can be done with conventional equipment as long as care is taken to cool the mechanical parts to avoid melting of the product during granulation. In subdividing the frozen extract, it is preferred to use pressure equipment which compresses and abrades the frozen coffee into a granular product as distinguished from equipment which slices or cuts the frozen extract into the desired particle size. The use of pressure equipment is believed to give a case-hardened surface to the coarser particles (those above 40 and 80 mesh) which is preserved on freeze-drying, thus giving better stability to the product.

The undesirable fraction of frozen coffee particles, i.e., those smaller than 80 mesh and 40 mesh may conveniently be screened from the granulated charge and totally or partially recycled into the liquid coffee extract. These small particles can also be used as "seeding" material for initiating controlled ice crystal formation. By the seeding operation, supercooling of the extract solution and spontaneous nucleation due to supercooling will be inhibited and the proper slow-freezing will take place. However, rather than use frozen extract, it is preferred that frozen crystals of ice water having a mesh size of between 20 and 40 mesh be used as the "seed" nucleus to induce rapid crystallization of water without entrainment of coffee solids. Seeding is done as the extract is cooled to below its ice point.

The freezing rate should be controlled in accordance with the soluble solids concentration of the extract, the more concentrated extract having less necessity for slow freezing. However, all extracts of less than 50% soluble solids usually require at least 15 minutes to develop the particular ice crystal structure shown in FIGS. 3 and 4, while extracts concentrated to above 50% soluble solids can be fast-frozen in periods of 3 to 15 minutes, say 5 to 10 minutes, while still retaining a dark color. Freezing times faster than 3 minutes give an undesirable light color regardless of the concentration.

While varying vacuum freeze-drying conditions may be employed, it is preferred in order to obtain rapid sublimation rates and at the same time reduce loss of volatile aromas, to use a freeze-drying technique which employs a vacuum of less than 500 microns and preferably about 100–250 microns to sublime water from the coffee extract in the frozen state. The sublimation temperature should be below the eutectic point of the coffee (−10° F.) and the temperature of the dried portions should be kept below 110° F. to avoid loss of volatiles and degradation of the final product. However, temperatures slightly above 110° F., say 115°–120° F., may be tolerated where the frozen coffee extract does not contain a high level of volatile aromatics.

The frozen charge of coffee particles may be dried in an agitated bed or a static bed. However, since it is a feature of this invention that the particles retain their particle integrity so as to resemble natural roasted and ground coffee, when the particles are freeze-dried in an agitated bed the agitation should be accomplished gently to avoid loss of particle appearance due to abrasion or attrition. In the case of a static bed, i.e., one involving no tumbling or agitation, it is preferable to keep the bed height at below one-half inch in order to assure good heat distribution into the interior portions of the bed.

By the process of this invention, very high concentrations of soluble coffee solids may be freeze-dried after being granulated to a coarse particle size. It appears that the increased surface area available for freeze-drying together with the increased number of void spaces provided by having a bed of three-dimensional granular particles is responsible for allowing the higher concentration of soluble coffee solids to be effectively freeze-dried to a terminal moisture of less than 2.5%.

When using extract containing higher concentrations of coffee solids, i.e., above 50% soluble solids, the final average bulk density of the dried product will be higher than that of the dried product obtained from extracts containing about 20–50% soluble solids due to the high solids content of the dried particles. While the final average bulk density of the dried product obtained from extracts of above 50% soluble solids will be higher than that of low solids products, thereby requiring reduction of the bulk density, the products obtained still retain all of the desirable stability qualities which result from the process of the present invention. Therefore, in the case of high solids concentrations, it may be desirable to reduce the average bulk density of the granular particles of greater than 80 mesh and have the bulk density approach that of conventional spray-dried soluble coffee powder. This reduction in bulk density may be accomplished by agglomeration of the particles. Known methods, such as that described in U.S. Patent No. 2,893,871 to H. L. Griffin issued July 7, 1959, may be used. In the Griffin process a jet of steam or other moistening fluid is introduced into a quantity of discretely arranged particles which are tackified and thereafter caused to contact one another to form the porous agglomerates desired. Alternatively, the density may be adjusted by foaming the concentrated extract prior to freezing. This also helps to give an expanded structure which can be freeze-dried more readily.

DESCRIPTION OF PREFERRED EMBODIMENTS

This invention will now be described by reference to the following specific examples:

Example 1

Aromatized coffee extract (containing a mixture of expressed coffee oil and volatile steam distilled aromas) and having a soluble solids concentration of 27% and a product temperature of 60° F. was poured into a stainless steel frezing tray having dimensions of 40" x 20" x ½". The freezing tray was then placed in a freezing room having an ambient temperature of —30° F. and chilled for about 20 minutes until it reached its ice point (28° F.). The extract, which was still in a substantially liquid state, was then seeded with about 1.5 lbs. of frozen extract having a particle size of less than 40 mesh (U.S. Standard Sieve Screen). About 90 minutes was then required to depress the temperature of the extract from its ice plant (280 F.) to below its eutectic point of —10° F. The freezing tray was removed from the freezing room, and the frozen slab separated from the freezing tray in preparation for the grinding operation.

The frozen slab was then ground in a Fitzpatrick Mill to a final particle size distribution of between 12 to 80 mesh. The grinding operation was conducted in a freezing room wherein the ambient temperature (as well as the temperature of the Fitzpatrick Mill) was below —30° F. The under 40 mesh fraction was then separated from the granular extract and used to initiate controlled freezing of the next charge of liquid extract.

The granular frozen extract was placed in a ½" stainless steel drying tray having dimensions of 40" x 21". The bed of frozen granular material had a height of ½". The drying tray was placed on a heating platen in a freez-drying chamber having a vacuum of below 500 microns. The platen temperature was raised uniformaly over a period of two hours to 160° F., held at this temperature for 4 hours and reduced to a temperature of 110° F. for the final 4 hours. The product temperature of the dried portions of the product during the freeze-drying was kept below 105° F. while the product temperature of the frozen product was kept below —10° F. The product reached a terminal moisture of less than 2% in about 15 hours.

The final product was uniformly dark in appearance and resembled a natural blend of roasted and ground coffee in its shape, color and appearance. The freeze-dried product had an average bulk density of about 0.20 gm./cc. and was found to approach the average bulk density of conventional spray-dried soluble coffee. A teaspoon of the freeze-dried product when added to a cup of boiling water reconstituted to an aromatic and flavorful coffee identical in all respects to a freshly prepared cup of brewed roasted and ground coffee.

Example 2

The procedure of Example 1 was followed except that conventional unaromatized coffee extract was used. The extract was slowly frozen with seeding, subdivided in a Fitzpatrick Mill, had its under 40 mesh fraction removed and recycled into the extract to initiate controlled freezing, and was then dried. The final product produced was similar in color, shape and appearance to the product of Example 1. The dried product, while not reconstituting to the aroma and flavor level of the Example 1 sample, still provided a unique and improved flavor and aroma when compared to a cup of reconstituted spray-dried coffee.

Example 3

Coffee extract was freeze-concentrated to 55% soluble solids and then frozen by placing 1 lb. portions of the extract in polyethylene bags and then immersing the bags in a —35° F. brine bath. The extract froze in 3 to 10 minutes and retained its dark color. The frozen extract was then ground, the —80 mesh fraction was screened from the frozen particles, and the frozen granular product was freeze-dried as in Example 1 to a terminal moisture of 1.5% in about 8 hours. The final product retained its dark color despite the relatively fast freezing time employed.

While this invention has been described by reference to several specified examples, it is intended to be limited only by the scope of the appended claims.

What is claimed is:

1. A method of preparing a dark-colored freeze-dried soluble coffee having a particle size, shape and appearance which resembles that of natural roasted and ground coffee which comprises seeding coffee extract containing less than 50% soluble coffee solids with material selected from the group consisting of frozen extract crystals and frozen water ice crystals as it is cooled to below its ice point; further cooling said extract to below its eutectic point over a period of at least 15 minutes at a rate sufficiently slow to form a non-ordered distribution of dendritic ice crystals, said dendritic ice crystals being characterized by non-parallel main stems, smaller extending branches from said main stems, and an absence of discrete ice crystals of non-dendritic form in the eutectic mixture located between said dendritic ice crystals; subdividing said frozen extract to obtain a granular particle form which resembles roasted and ground coffee, said particles having a granular size wherein at least 97% by weight are retained on an 80 mesh U.S. Standard Sieve Screen, and freeze-drying said particles under a vacuum of less than 500 microns.

2. The process of claim 1 wherein the frozen extract is subdivided by grinding, said grinding developing a case-hardened surface film on the above 80 mesh particles.

3. The process of claim 1 wherein the frozen coffee extract has a particle size of at least 90% greater than 40 mesh U.S. Standard Sieve Screen.

4. The process of claim 1 wherein the extract is seeded with frozen crystals of extract as the extract is depressed to the ice point, said seeding preventing supercooling and spontaneous nucleation during the initial ice crystal formation.

5. The process of claim 4 wherein the under 80 mesh fraction is removed from said granular material obtained from subdividing a body of frozen extract and added to a subsequent body of liquid extract as freezing of said charge commences.

6. The process of claim 4 wherein the mesh fraction is under 40 mesh.

7. The process of claim 1 wherein the extract is seeded with frozen crystals of water ice as the extract is depressed to the ice point, said seeding preventing supercooling and spontaneous nucleation during the initial ice crystal formation.

8. The process of claim 7 wherein the ice crystals are between 20 and 40 mesh.

9. A method of preparing a dark-colored freeze-dried soluble coffee having a particle size, shape and appearance which resembles that of natural roasted and ground coffee which comprises cooling coffee extract containing above 50% soluble coffee solids from its ice point to below its eutectic point over a period of 3 to 15 minutes, subdividing said frozen extract to obtain a granular particle form which resembles roasted and ground coffee, said particles having a granular size wherein at least 97% by weight are retained on an 80 mesh U.S. Standard Sieve Screen, and freeze-drying said particles under a vacuum of less than 500 microns.

10. The process of claim 9 wherein the frozen coffee extract has a particle size of at least 90% greater than 40 mesh U.S. Standard Sieve Screen.

References Cited

UNITED STATES PATENTS

| | | | |
|---|---|---|---|
| 2,292,447 | 8/1942 | Irwin | 99—199 |
| 2,509,681 | 5/1950 | Flosdorf | 99—199 XR |
| 2,751,687 | 6/1956 | Colton | 34—5 |
| 3,293,766 | 12/1966 | Togashi et al. | 99—71 XR |

FOREIGN PATENTS 1,386,773  12/1964  France.

OTHER REFERENCES

Harris, R. J. C., Biological Applications of Freezing and Drying, 1954, Academic Press, Inc., N.Y., p. 93.

Lee, S., Tea and Coffee Trade Journal, May 1959, vol. 116, No. 5, pp. 36, 41–44 and 46.

Mullin, J. W., Crystallization, 1961, Butterworths, London, pp. 128, 129, 159, 160.

Sivetz, M., Food Engineering, May 1959, pp. 92–93.

MAURICE W. GREENSTEIN, *Primary Examiner.*

U.S. Cl. X.R.

99—199; 34—5